(12) United States Patent
Krey, Jr.

(10) Patent No.: US 7,087,132 B2
(45) Date of Patent: Aug. 8, 2006

(54) METHOD OF DECORATIVE EMBOSSING OF A PANEL FOR A VEHICLE

(75) Inventor: Richard Krey, Jr., Detroit, MI (US)

(73) Assignee: R&B Products, Inc., Dearborn, MI (US)

( * ) Notice: Subject to any disclaimer, the term of this patent is extended or adjusted under 35 U.S.C. 154(b) by 60 days.

(21) Appl. No.: 10/194,797

(22) Filed: Jul. 12, 2002

(65) Prior Publication Data
US 2004/0009330 A1 Jan. 15, 2004

(51) Int. Cl.
*G09F 21/04* (2006.01)

(52) U.S. Cl. .................. 156/242; 156/307.7; 264/213; 264/214; 264/258; 264/338; 264/257; 40/591; 40/594; 40/596; 40/616; 40/800

(58) Field of Classification Search ............... 156/245, 156/242, 307.7; 264/213, 214, 258, 308, 264/334, 338, 241, 257, 294, 299, 300, 309; 428/31; 40/413, 588–594, 596, 616, 800
See application file for complete search history.

(56) References Cited

U.S. PATENT DOCUMENTS

| | | | | |
|---|---|---|---|---|
| 3,608,038 | A * | 9/1971 | Smith | .......................... 264/162 |
| 4,605,575 | A | 8/1986 | Auld et al. | |
| 4,630,537 | A | 12/1986 | Pretorius | |
| 4,724,173 | A * | 2/1988 | Rockett et al. | ........... 427/389.8 |
| 4,818,465 | A | 4/1989 | Mente | |
| 4,830,898 | A | 5/1989 | Smith | |
| 4,879,152 | A * | 11/1989 | Green | ........................... 428/73 |
| 5,188,882 | A * | 2/1993 | Uchiyama et al. | ........... 428/159 |
| 5,213,747 | A * | 5/1993 | Lippert | ........................ 264/226 |
| 5,273,597 | A | 12/1993 | Kumagi et al. | |
| 5,554,237 | A * | 9/1996 | Harada et al. | ................. 156/60 |
| 6,070,629 | A | 6/2000 | Whiteside | |
| 6,207,077 | B1 * | 3/2001 | Burnell-Jones | ......... 252/301.36 |
| 6,235,228 | B1 * | 5/2001 | Nicholl et al. | ............... 264/255 |
| 6,314,906 | B1 * | 11/2001 | Tesfaye | ....................... 114/357 |
| 6,322,859 | B1 | 11/2001 | Pluim et al. | |
| 6,349,754 | B1 | 2/2002 | Johnson et al. | |
| 2002/0178672 | A1 * | 12/2002 | Robinson et al. | ........... 52/309.1 |

OTHER PUBLICATIONS

FibreGlast Releases Page, http://www.fibreglast.com/ReleasesPage.htm, Mar. 31, 2001. Found on http://web.archive.org/web/20010331102120/http://www.fibreglast.com/ReleasesPage.htm.*

FibreGlast Molding Fiberglass, http://www.fibreglast.com/MoldingFiberglass.htm, Jun. 3, 2001. Found on http://web.archive.org/web/20010603043119/http://www.fibreglast.com/MoldingFiberglass.htm.*

(Continued)

*Primary Examiner*—Sam Chuan Yao
*Assistant Examiner*—Barbara J. Musser
(74) *Attorney, Agent, or Firm*—Dobrusin & Thennisch PC

(57) ABSTRACT

A decoratively embossed panel of a molded form includes an exterior design that preferably reflects some aspect of the services advertisement. For example, a bricklayer may choose an embossed panel having a three-dimensional brick design in addition to a logo, service and/or trademark and other pertinent information to aid potential customers in understanding the services provided in conjunction with the servicemark and contact information. The embossed panel is removably attachable to any portion of a vehicle by any attaching mechanism such as double stick foam tape.

24 Claims, 6 Drawing Sheets

OTHER PUBLICATIONS

FibreGlast Filler Page, http://www.fibreglast.com/FillerPage.htm, Jun. 17, 2001. Found on http://web.archive.org/web/20010617184234/http://www.fibreglast.com/FillerPage.htm.*

A photocopy depicting a rear portion of a 1970 Ford Bronco wherein the FORD trademark was steel embossed upon the tailgate during production of the vehicle.

* cited by examiner

METHOD OF DECORATIVE EMBOSSING OF A PANEL FOR A VEHICLE

TECHNICAL FIELD

The present invention relates to a decoratively embossed panel of a molded form for application on a motor vehicle, and a method of and an apparatus for manufacturing the panel.

BACKGROUND OF THE INVENTION

Advertising on a motor vehicle is common and often includes after market signage that may be painted on to a fender, tailgate or door. Alternatively, a magnetic sign including desired advertising may be purchased and located on any metal surface of the automotive vehicle. These forms of advertisement are desirable to attract potential business while the vehicle is in use, such as driving to and from a work site and parking at the work site or business location. The vehicle becomes a roaming billboard for a company. Like all advertisements, it is important to stand out and attract an audience. A magnetic sign or information painted on a vehicle can be rather mundane or nondescript, failing to attract customers, such as those driving in traffic, or failing to adequately describe the services provided.

It would therefore be desirable to provide an advertising medium for an automotive vehicle that would be both attractive and explanatory to an audience of potential customers.

SUMMARY OF THE INVENTION

The present invention meets this need by providing a decoratively embossed panel of a molded form including an exterior design that preferably reflects some aspect of the services advertised. For example, a bricklayer may choose an embossed panel having a three-dimensional brick design in addition to a logo, service and/or trademark and other pertinent information to aid potential customers in understanding the services provided in conjunction with the servicemark and contact information. The embossed panel is removably attachable to any portion of a vehicle by any attaching mechanism such as double stick foam tape.

The panel design may range from a basic rectangular billboard to an intricate and detailed pattern. The embossed panel may be clear or contain any color pigment or pattern, including metal flake or wood grain, which is desired and available. In addition, a tailgate handle relocating kit may be provided if the user desires to place the embossed panel on the tail kit in an area occupied by the tailgate handle.

Although multi-layer embossing techniques have been used in the automotive industry for producing automotive skin material, none have met the needs or used the methods and techniques of the present invention. For example, U.S. Pat. No. 6,349,754 discloses a method for making a decorative laminate, however, the skin material is created using a dry paint transfer sheet for covering of functional interior automotive components including instrument panels, door panels and the like.

These and other objects of the present invention will become apparent upon reading the following detailed description in combination with the accompanying drawings, which depict systems and components that can be used alone or in combination with each other in accordance with the present invention.

DESCRIPTION OF THE PREFERRED EMBODIMENT

Figure 4:
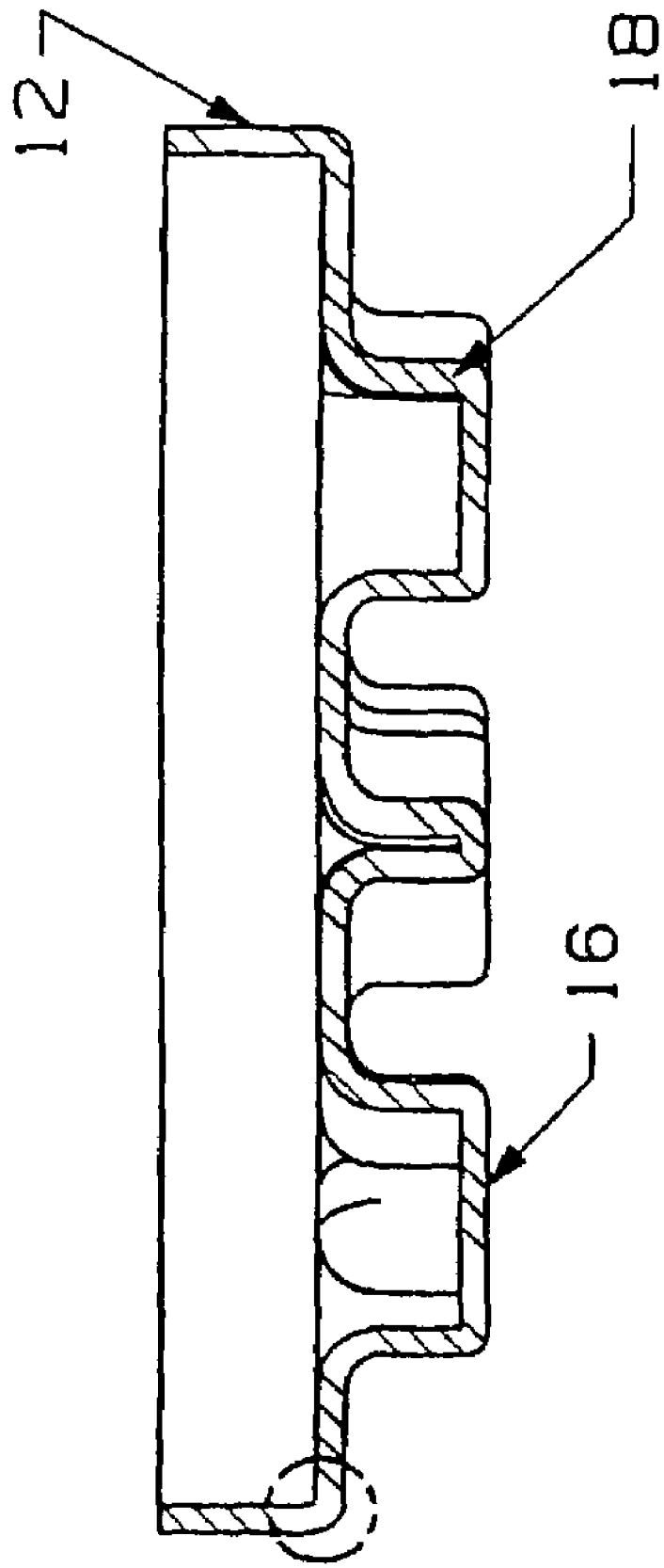
FIG. 4 illustrates a horizontal cross-sectional view along lines A—A of FIG. 1.
Figure 5:
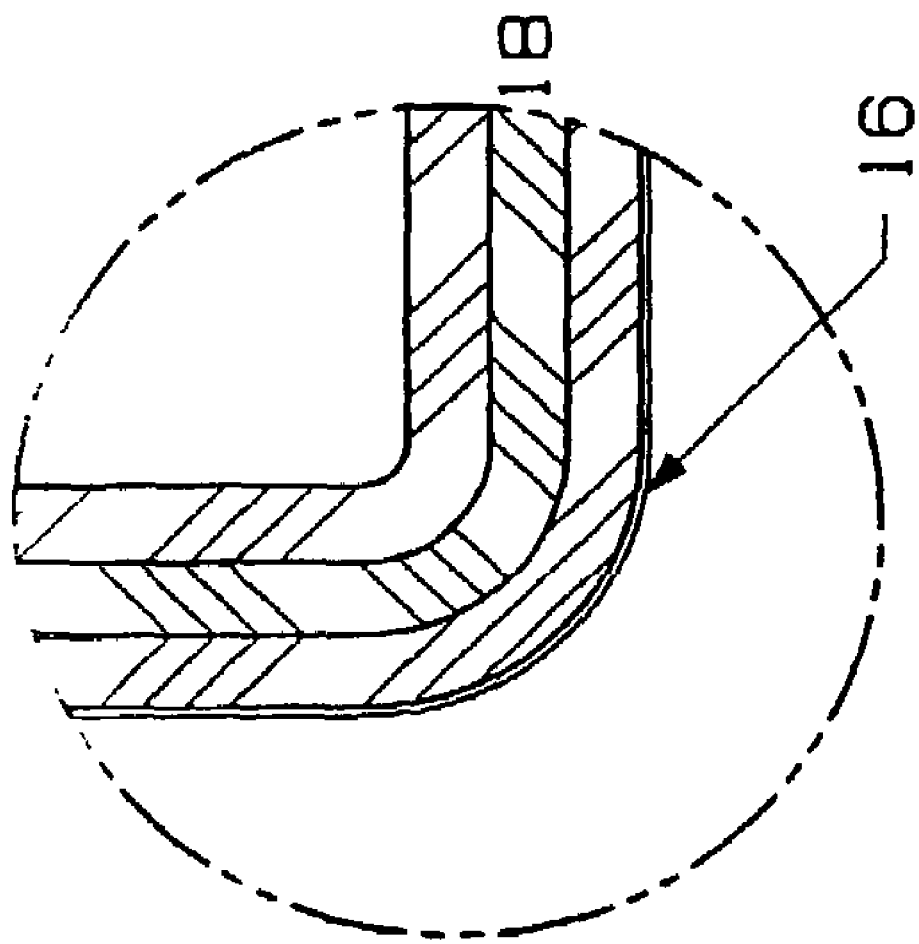
FIG. 5 illustrates an enlarged fragmentary view of the horizontal cross-sectional view as shown in FIG. 4 of a decoratively embossed panel of the present invention.
Figure 6:
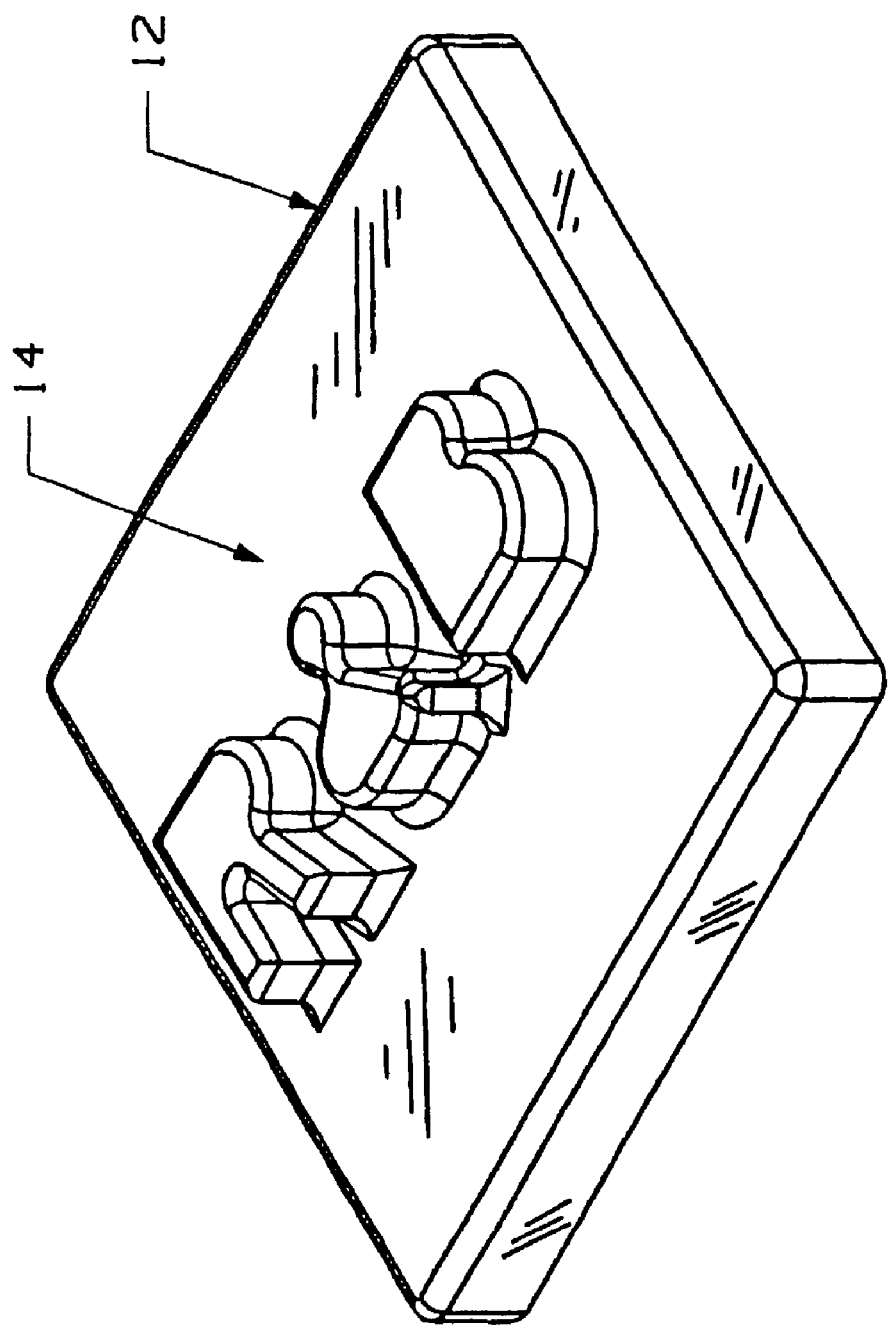
FIG. 6 illustrates a perspective view of a decoratively embossed panel of the present invention.

The decoratively embossed panel of the present invention is made by a multi-stage, multi-layer process to form the apparatus desired and described below. FIGS. 1–3, and 6 illustrate the embossed panel and FIGS. 4–5 illustrate the multi-layering used to create a preferred embodiment.

With reference to FIGS. 1–3 and 6, an embossed decorative panel 12 is shown including a decorative design of the logo "R & B" 14 as an example of the preferred method and apparatus of the present invention. The panel 12 is preferably three-dimensional in addition to the raised designs formed by the embossing method. The embossed three-dimensional panel is created by layering a multiplicity of elements on top of a substrate. The substrate is preferably a mold including an interior design mirroring the design desired for the panel. By way of example, if an embossed panel is desired to reflect the work or services of a kitchen remodeler, the mold may include the shape of a kitchen cabinet along with indicia advertising the remodeler's location and contact information. The mold may be formed by any traditional means or may be formed in the identical method for forming the embossed panel of the present invention as described below.

Once a mold has been created or chosen for the substrate of the embossed panel 12, a waxy substance is applied as the initial layer and covers the entire substrate. This waxy substrate is allowed to set and then buffed. Preferably, the waxy substance is a parting wax, and more preferably is a non-silicon green wax. One to three coats of parting wax may be applied to the substrate. Each of the first two coats of parting wax should be applied and buffed only after each coat has been allowed to set for one hour. A third and final coat of parting wax may then be applied and hazed over. Once completely hazed over, this third coat may then be buffed off.

A coating of a releasable substance is sprayed onto the substrate after waxing. Preferably, the releasable substance, or mold release, includes polyvinyl chloride and alcohol or PVA. One to three coats of PVA is sprayed onto the mold surface using a pressurized spray gun. The mold substrate is now prepped with a barrier of layers to receive and release the elements used to form a decorative embossed panel.

Alternatively, a one-step water based mold release may replace the two-step process described above. In this embodiment, the method for preparing the substrate includes applying a mold release, such as FIBRELEASE #1153, a trademark of Fiber Glast, a fiberglass supply company. This product may be sprayed or applied in any manner to the substrate and is not buffed. This method does not create an impregnable barrier layer as described above and is recommended for use with flatter designs where minimal damage may result if the gel coat, described below, adheres to the substrate.

With reference to FIGS. 4–5, one to three coats of gel coat 16 are applied to the substrate and will form the surface of the panel 12 when completed. Each coat is applied with a brush, in the case of smaller projects, or a dump gun for larger panels. When using a dump gun, the gel coat 16 may be sprayed without reducing or thinning the substance. Preferably, the gel coat 16 includes a mixture of methyl ethyl ketone peroxide, MEKP, as a hardening agent. If MEKP is present within the gel coat substance, the gel coat has a pot life of between ½ and 1 hour before the gel coat becomes too thick for application. This time discrepancy is based on the ambient temperature and the ratio of MEKP to gel added to the substance.

The gel coat 16 may be formed of polyester or epoxy resin and may include a color pigment. In the preferred method, a clear gel coat is sprayed onto the substrate and allowed to dry. An OEM paint color is then sprayed over the gel coat to create the desired color design and pattern. The OEM paint product is currently available as a urethane or polyurethane substance. Alternatively, if a pattern, such as a sparkle, is desired, a clear coat of gel is applied and allowed to dry, followed by a clear coat of gel mixed with metal flake. In all embodiments, each application of gel coat and color is allowed to dry prior to subsequent applications of gel coat or color.

A thinning additive may be added to the already mixed gel coat, preferably in a ratio of 5–15% by volume. Alternative applications of the gel coat may now be implemented such as using a conventional siphon feed, gravity feed or pressure feed (HVLP) spray guns. The added thinning additive also enhances surface gloss. Preferably the thinning agent used is Duratec #904-001, a product made by Dura Technologies.

At least one layer of a composite material 18 is then applied over the dried gel coat 16 and subsequent paint color layers. Preferably, multiple layers of the composite material 18 are applied and wetted out with a resin. In FIG. 5, three layers of composite material 18 having been applied to the gel coat 16 to form the embossed panel 12 of the present invention. The composite material is preferably formed from a material chosen from the group of fiberglass, fiberglass mat, fiberglass cloth, carbon fiber cloth, KEVLAR cloth, and/or a hybrid KEVLAR/carbon fiber.

The resin is preferably a thick liquid that is added to the composite material with either a brush or spray gun as described above. More preferably, the resin used may be chosen from the group of a polyester or vinyl resin that includes a MEKP hardener for activation, or a two part epoxy resin that consists of a base material, the resin, and an activator agent.

Additionally, a thickening agent, such as thixotropic silica may be added to the resin that may be necessary when applying the resin to a composite material on a vertical surface. The thickening agent prevents the resin from sagging and running. Alternatively, a thinning agent, such as styrene thinner may be added to the resin when it is desirable to apply the resin with a spray gun to wet the composite material.

If the substrate includes very narrow or small voids forming at least a portion of the embossed decorative panel, composite material 18 may not fill these voids and an additional step of adding a resin paste may be necessary. Preferably, the resin paste is formed from a mixture of resin chosen from the group above and additional material chosen from the group of talc, glass microspheres, and/or milled glass fibers. This mixture, although potentially not as strong as the wetted composite material, creates a paste that may be applied by brush for example to fill these small voids and create a wholly embossed panel 12.

After the composite material 18 is completely saturated, rollers are used to roll out and remove all air pockets formed between and beneath the wetted composite material.

Alternatively, the composite material 18 and resin composition may be applied by using a chopper gun assembly. After the gel coat 16 is applied and set up, the resin composition is applied preferably with a dump gun. A chopper gun is used to apply chopped up strands of the composite material 18 to the resin composition. The chopper gun is supplied with composite material via a roving roll of material, such as fiberglass, that is fed into the chopper gun. The chopper gun chops up this material and blows the resulting strands onto the wetted resin layer surface. This method is preferably reserved for use with larger projects absent the narrow and small voids described above.

Figure 1:
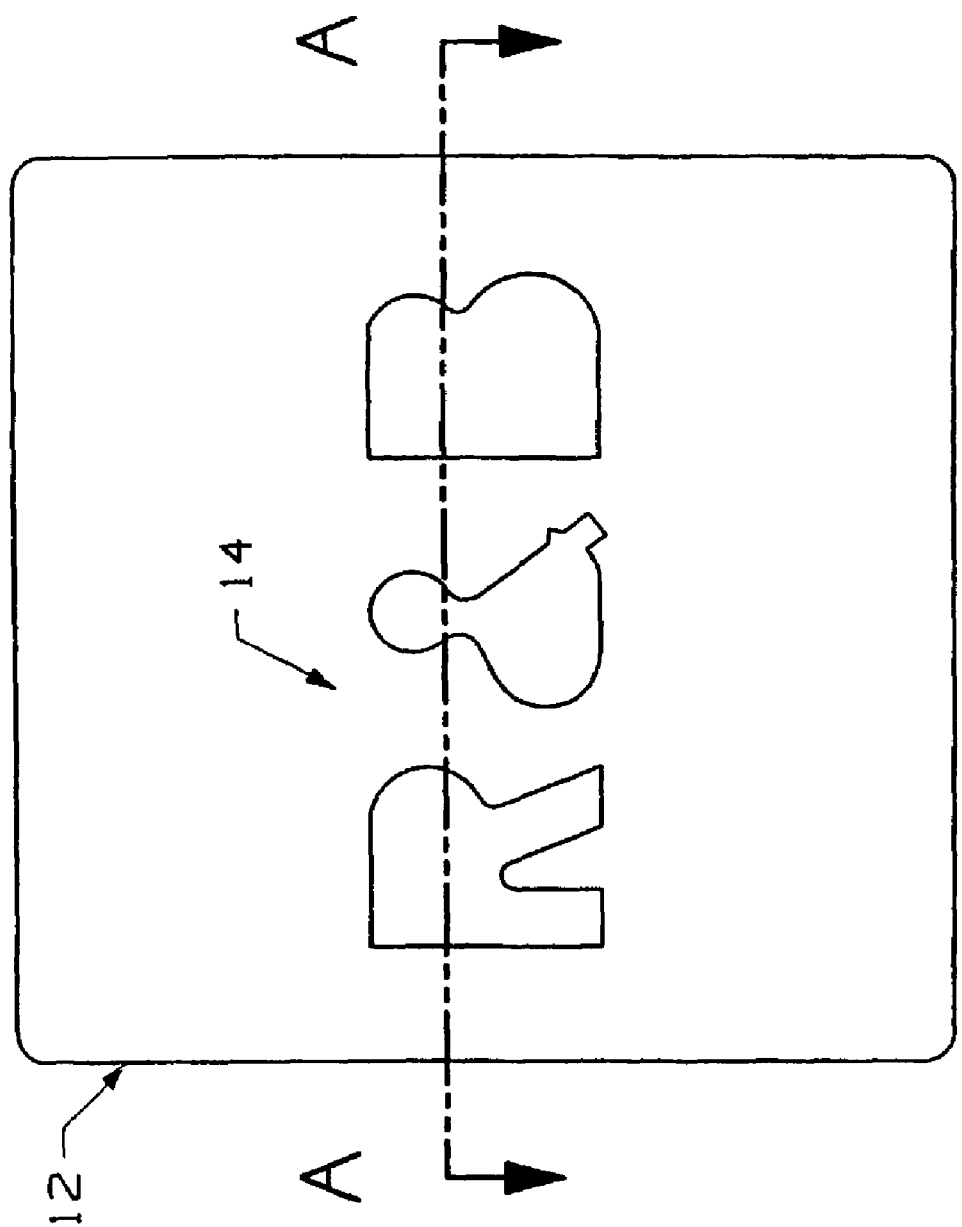
FIG. 1 illustrates a front view of a decoratively embossed panel of the present invention.
Figure 2:
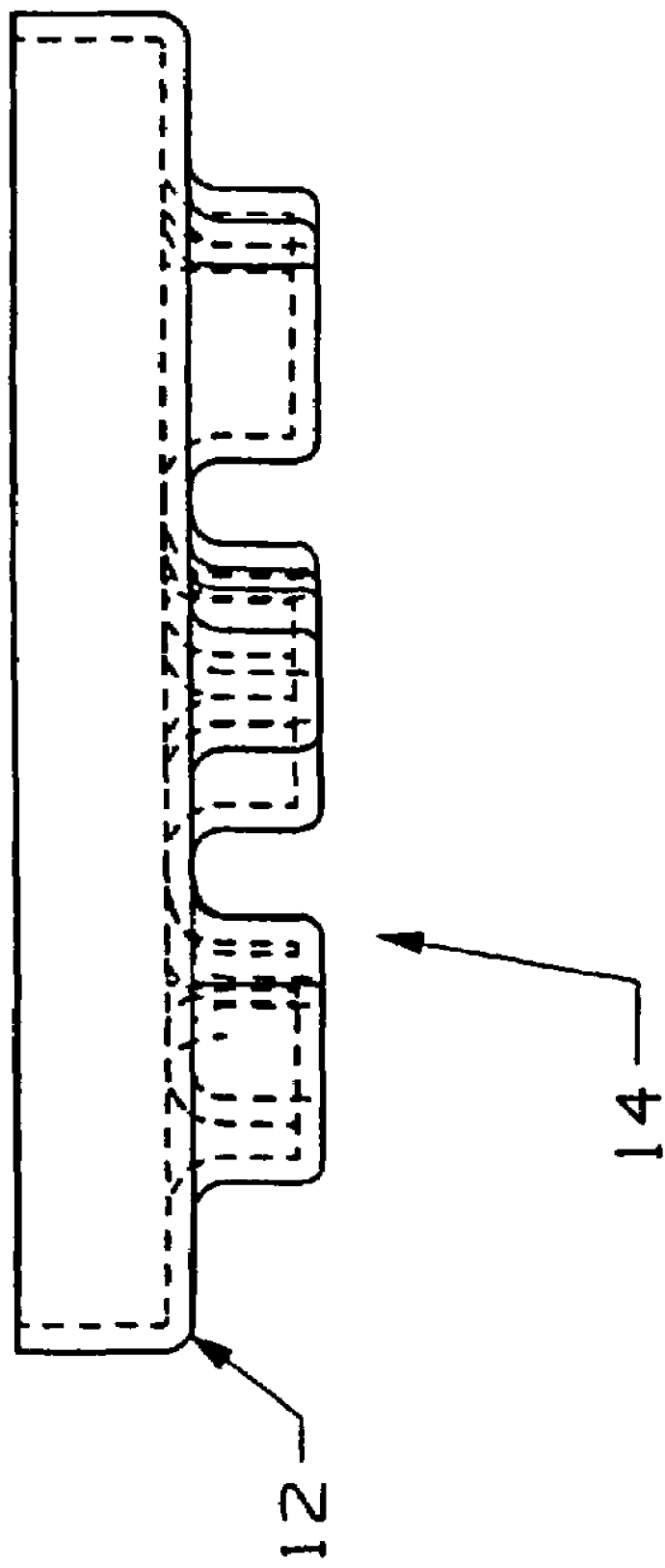
FIG. 2 illustrates a top view of a decoratively embossed panel of the present invention.
Figure 3:
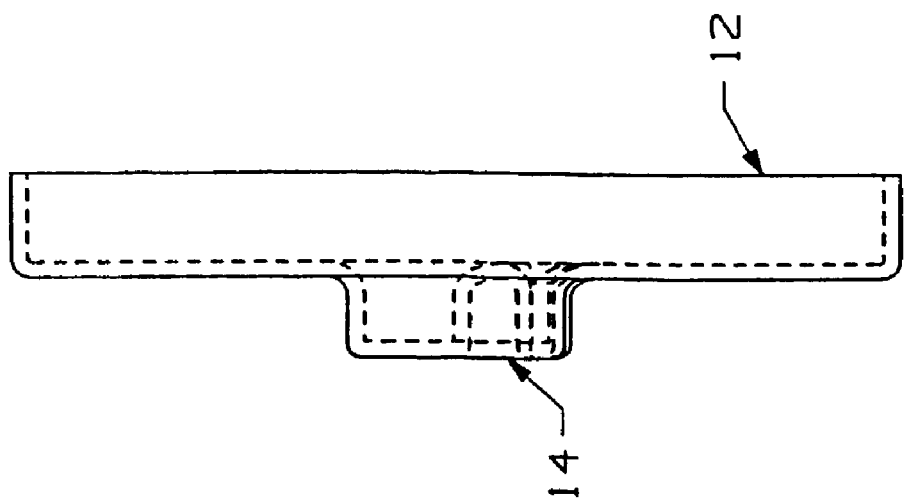
FIG. 3 illustrates a side view of a decoratively embossed panel of the present invention.

After the multi-layers of composite material are completely set up or dried, the panel is formed and may be removed from the substrate. The panel is a mirror image of the substrate mold and is attachable to any portion of an automotive vehicle by any means such as double stick foam tape. The embossed decorative panel has at least one layer of the gel coat forming the outer surface of the desired design and indicia as shown in FIG. 1.

With reference to the mold used to form the underlying substrate, the initial step for forming the mold from an existing object, such as a kitchen cabinet, is cleaning the cabinet surface area of all imperfections. Once the surface area is prepped, the cabinet is sealed to eliminate the porous surface area, providing a smooth and sealed surface area for applying the multi-layer embossing technique described above.

It is envisioned that the decoratively embossed panel of the present invention may be applied to many areas of a vehicle (e.g. viewable portions). Some uses may include, but are not limited to, a rear spare tire carrier, a rear roll pan, the front cover of the rear view mirrors (both sides and central mirrors,) a fuel door, the bug deflector or grill assembly located in the front of a vehicle, the vehicle bumpers (both front and rear,) partial or all of the rear window, partial or all of the rear side windows, the rear spoiler, the visors, the tailgate, the t-top or any body panel forming the vehicle. In addition, the embossed panel may include reflective indicia that may be read by a driver when viewed through the driver's rear view mirror.

It should be understood that the invention is not limited to the exact embodiment or construction that has been illustrated and described but that various changes may be made without departing from the spirit and the scope of the invention.

The invention claimed is:

1. A method of manufacturing a panel for use with a vehicle, comprising the steps of:
    applying at least one coat of a waxy substance to a substrate, said substrate comprising a mold including an interior having the desired three-dimensional outer shape of said panel;
    allowing said waxy coat to set;
    buffing said waxy coat;
    spraying a coating of a releasable substance on top of said waxy coat;

applying at least one coat of gel on top of said releasable substance, said gel coat forming the surface of said panel;

drying said gel coat;

applying at least one layer of a composite material to said gel coat;

wetting said composite material with a resin until said composite material is saturated;

rolling out said saturated composite material to remove any air pockets that may have formed between said material and said gel coat during wetting;

drying said composite material;

removing said composite material from said substrate; wherein the outer shape of said composite material with said gel coat forms the desired outer shape of said panel; and attaching said panel to a portion of a completely assembled vehicle.

2. A method of manufacturing a panel for use with a vehicle as defined in claim 1, wherein at least three coats of said waxy substance may be applied to said substrate, allowing the first and second coat to set for approximately one hour before buffing and applying another coat.

3. A method of manufacturing a panel for use with a vehicle as defined in claim 2, wherein the third coat of said waxy substance is buffed after applying and hazed over.

4. A method of manufacturing a panel for use with a vehicle as defined in claim 3, wherein said waxy substance is parting wax, and more preferably a non-silicon green wax.

5. A method of manufacturing a panel for use with a vehicle as defined in claim 1, wherein said releasable substance is comprised of a polyvinyl chloride and alcohol.

6. A method of manufacturing a panel for use with a vehicle as defined in claim 1, wherein said releasable substance is sprayed on using a pressurized spray gun.

7. A method of manufacturing a panel for use with a vehicle as defined in claim 1, wherein at least three coats of said gel coat may be applied to said releasable substance.

8. A method of manufacturing a panel for use with a vehicle as defined in claim 1, wherein said gel coat is applied with a brush.

9. A method of manufacturing a panel for use with a vehicle as defined in claim 1, wherein said gel coat is mixed with a hardener, and more preferably a MEKP hardener.

10. A method of manufacturing a panel for use with a vehicle as defined in claim 1, wherein said gel coat is mixed with a thinning additive.

11. A method of manufacturing a panel for use with a vehicle as defined in claim 9, wherein said gel coat is a clear coat.

12. A method of manufacturing a panel for use with a vehicle as defined in claim 11, further comprising the step of, after drying said gel coat, spraying a colored pigment on to said gel coat.

13. A method of manufacturing a panel for use with a vehicle as defined in claim 1, wherein multiple layers of composite material may be applied before wetting with said resin.

14. A method of manufacturing a panel for use with a vehicle as defined in claim 1, further comprising the steps of, after applying said composite material, mixing a paste formed of resin and one of the materials chosen from the group of: talc, glass microspheres and milled glass fibers; and applying said paste to areas within the substrate that are not filled during application of said composite material.

15. A method of manufacturing a panel for use with a vehicle as defined in claim 1, wherein said wetting resin is formed of a material consisting of a polyester or vinyl resin and including: an activator such as MEKP hardener, a thickening agent including thixotropic silica or a thinning agent including a styrene thinner.

16. A method of manufacturing a panel for use with a vehicle, comprising the steps of:

applying a waxy substance to a three-dimensional recess of a mold;

allowing said waxy coat to set;

applying a layer of a releasable substance over the waxy substance and said three-dimensional recess;

applying at least one coat of gel over said releasable substance and the three-dimensional recess;

drying said gel coat to form a layer;

applying at least one layer of a composite material over said gel coat and said three-dimensional recess;

wetting said composite material with a resin;

drying said composite material to form at least one layer of composite material;

removing said gel coat and said composite material from the mold to form a multi-layered panel, wherein each of the multiple layers of the panel have a corresponding shape to the three-dimensional recess of the mold; and attaching said multi-layered panel to a portion of a completely assembled vehicle.

17. The method of claim 16, further comprising the step of buffing said waxy coat.

18. The method of claim 17, further comprising the step of wetting said composite material with a resin until said composite material is saturated.

19. The method of claim 18, further comprising the step of rolling out said saturated composite material to remove any air pockets that may have formed between said material and said gel coat during wetting.

20. The method of claim 19, wherein the gel coat includes color pigment.

21. The method of claim 19, wherein the outer surface of the panel reflects a design, logo, service or trademark.

22. The method of claim 16, wherein said attachment of said panel to said vehicle comprises double stick foam tape.

23. The method of claim 1, wherein said gel coat is applied with a dump gun.

24. The method of claim 9, wherein said gel coat comprises a colored pigment.

* * * * *